United States Patent [19]
Yasukawa et al.

[11] Patent Number: 5,999,622
[45] Date of Patent: Dec. 7, 1999

[54] METHOD AND APPARATUS FOR PROTECTING WIDELY DISTRIBUTED DIGITAL INFORMATION

[75] Inventors: Hiroshi Yasukawa; Takashi Kurosawa, both of Tokyo, Japan

[73] Assignee: Microsoft Corporation, Redmond, Wash.

[21] Appl. No.: 08/562,260

[22] Filed: Nov. 22, 1995

[51] Int. Cl.$^6$ ........................................ H04L 9/00
[52] U.S. Cl. ........................................... 380/4
[58] Field of Search ............................ 380/4, 25, 23, 380/3

[56] References Cited

U.S. PATENT DOCUMENTS

| | | | |
|---|---|---|---|
| 4,796,181 | 1/1989 | Wiedemer . | |
| 4,984,272 | 1/1991 | McIlroy et al. . | |
| 5,047,928 | 9/1991 | Wiedemer . | |
| 5,058,162 | 10/1991 | Santon et al. | 380/25 |
| 5,081,675 | 1/1992 | Kittirutsunetorn | 380/4 |
| 5,155,680 | 10/1992 | Wiedemer . | |
| 5,341,429 | 8/1994 | Stringer et al. | 380/23 |
| 5,495,533 | 2/1996 | Linehan et al. | 380/21 |
| 5,559,888 | 9/1996 | Jain et al. | 380/25 |
| 5,592,549 | 1/1997 | Nagel et al. | 380/4 |
| 5,598,470 | 1/1997 | Cooper et al. | 380/4 |

OTHER PUBLICATIONS

Blaze, Matt, "Cryptographic File System for UNIX" Proc. 1st ACM Conference on Computer Communications and Security, Fairfax, VA, pp. 9–16.

R. Mori and M. Kawahara, "Superdistribution: The Concept and the Architecture," The Transactions of the IEICE, vol. E 73, No. 7, Jul. 1990, pp. 1133–1146.

E. Gudes, "The Design of a Cryptography Based Secure File System," IEEE Transactions on Software Engineering, vol. SE–6, No. 5, Sep. 1980, pp. 411–420.

Matt Blaze, Key Management in an Encrypting File System, Summer Usenix, Boston, MA, Jun. 6–10, 1994, pp. 27–35.

W. Caelli, I. Graham, and L. O'Connor, "Cryptographic Application Programming Interfaces (APIs)", Computers & Security, vol. 12, No. 7, 1993, pp. 640–645.

Press Release—Mar. 23, 1994, "Microsoft: NTT and MS Announce Alliance to Develop Services".

*Primary Examiner*—Gail O. Hayes
*Assistant Examiner*—Bryan Latham
*Attorney, Agent, or Firm*—Klarquist Sparkman Campbell Leigh & Whinston, LLP

[57] ABSTRACT

To facilitate protected distribution of digital data files, the files are segmented, and each segment (e.g. disk sector) is encrypted separately. Some segments can be left unencrypted, speeding access since less decryption is required. Different segments can utilize different encryption techniques, increasing protection against unauthorized decryption. A table stored in association with the encrypted data provides authorized users with data identifying the encrypted segments, and the form of encryption used. Decryption is accomplished with a layered set of operating system software that operates in conjunction with said table. Specialized APIs aren't used; applications programs are provided with unencrypted data using conventional APIs. Internal interfaces, invisible to the APIS, intercept normal processing calls (e.g READs) and direct them to internal decryption software that returns decrypted data back to the APIs.

38 Claims, 7 Drawing Sheets

METHOD AND APPARATUS FOR PROTECTING WIDELY DISTRIBUTED DIGITAL INFORMATION

FIELD OF INVENTION

The present invention relates to data encryption and decryption, and more particularly relates to the provision of support for transparent sector-based decryption in the file system of a computer operating system.

BACKGROUND AND SUMMARY OF THE INVENTION

The nature and structure of information stored in a digital format (e.g. computer software, multimedia information, etc.) allows it to be copied and distributed easily over a wide variety of mediums, including modems, wireless technologies, CD-ROMs, floppy disks, the Internet, bulletin boards, computer networks, etc. This attribute makes digital information difficult to protect.

One prior art solution for protecting, yet widely disseminating, digital information is to allow free distribution of the information in encrypted form. An example of such a system is disclosed in Mori, R., "Superdistribution: The Concept and Architecture", Transaction of the Institute of Electronics, Information and Communications Engineers, vol. E73, no. 7, pp. 1133–46, July 1990 (Japan).

In systems such as that taught by Mori, the storage of digital information in an encrypted format allows any user to obtain a copy of the information for free, or for a small fee that covers the cost of the associated storage medium.

After previewing a deliberately unencrypted sample of the information, if the user actually wants to use the full set of information (e.g. to view data, play a game, use an application program, etc.) the user can do so by paying a fee. After the fee is paid, (usually electronically by use of a credit card), the user receives a decryption key which allows decryption and use of the digital information.

In prior art systems of the foregoing type, the encrypted data is typically encrypted on a file by file basis. That is, a whole file of data is encrypted as a unit. Such an approach, however, has various drawbacks. For example, the whole file of data must be decrypted before any of the information can be used, even if only a small portion of the information is needed. This wastes computational time and computer resources.

Within the field of data encryption/decryption generally, there are prior art "secure" file systems which have the capability to perform encryption/decryption operations transparently to the user, as data is written to/read from a storage medium. A number of such systems are disclosed in the cited references.

These secure file systems, too, have various drawbacks. For example, there is little flexibility as to the encryption method, encryption pattern, or decryption key type to be used. Accordingly, the information must be encrypted with a method, pattern and key type that are already known to the file system. Further, the operating system must provide a set of especially adapted application programs to handle encrypted information. Existing programs must be extensively revised to make use of the additional application programs before they can be run using the secure file system.

In accordance with a preferred embodiment of the present invention, the foregoing and other problems of the prior art are overcome. In the preferred embodiment, data is encrypted on a per-sector basis. Some portion of a sector comprising a file can be left unencrypted, speeding access since less decryption is required. Different files can utilize different encryption depth techniques, increasing protection against unauthorized decryption.

Decryption is accomplished with a layered set of operating system software that operates in conjunction with specialized APIs. Application programs are provided unencrypted data using conventional APIs, by issuing calls to the specialized APIs which identify the encrypted files and the form of encryption used. Internal interfaces, invisible to the APIs, intercept normal processing calls (e.g READS) and direct them to internal decryption software that returns decrypted data back to the APIs.

The foregoing and other features and advantages of the preferred embodiment of the present invention will be more readily apparent from the following detailed description, which proceeds with reference to the accompanying drawings.

DETAILED DESCRIPTION OF A PREFERRED EMBODIMENT

Figure 1:
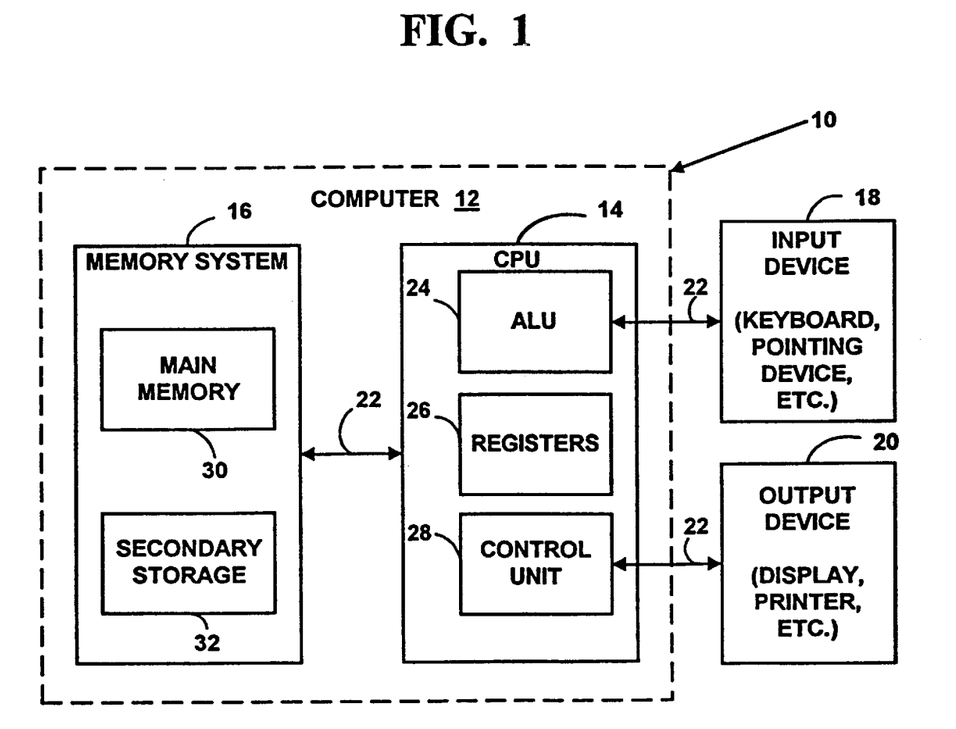
FIG. 1 is a block diagram of a computer system used to implement a preferred embodiment of the present invention.

Referring to FIG. 1, an operating environment for the preferred embodiment of the present invention is a computer system 10 with a computer 12 that comprises at least one high speed processing unit (CPU) 14, in conjunction with a memory system 16, an input device 18, and an output device 20. These elements are interconnected by a bus structure 22.

The illustrated CPU 14 is of familiar design and includes an ALU 24 for performing computations, a collection of registers 26 for temporary storage of data and instructions, and a control unit 28 for controlling operation of the system 10. Any of a variety of processors, including those from Digital Equipment, Sun, MIPS, IBM, Motorola, NEC, Intel, Cyrix, AMD, Nexgen and others can be used for CPU 14. Although shown with one CPU 14, computer system 10 may alternatively include multiple processing units.

The memory system 16 includes main memory 30 and secondary storage 32. Illustrated main memory 30 is high speed random access memory (RAM) and read only memory (ROM). Main memory 30 can include any additional or alternative high speed memory device or memory circuitry. Secondary storage 32 takes the form of long term storage, such as ROM, optical or magnetic disks, organic memory or any other volatile or non-volatile mass storage system. Those skilled in the art will recognize that memory 16 can comprise a variety and/or combination of alternative components.

The input and output devices 18, 20 are also familiar. The input device 18 can comprise a keyboard, mouse, pointing device, sound device (e.g. a microphone, etc.), or any other device providing input to the computer system 10. The output device 20 can comprise a display, a printer, a sound device (e.g. a speaker, etc.), or other device providing output to the computer system 10. The input/output devices 18, 20 can also include network connections, modems, or other devices used for communications with other computer systems or devices.

As is familiar to those skilled in the art, the computer system 10 further includes an operating system and at least one application program. The operating system is the set of software which controls the computer system's operation and the allocation of resources. The application program is the set of software that performs a task desired by the user, making use of computer resources made available through the operating system. Both are resident in the illustrated memory system 16.

In accordance with the practices of persons skilled in the art of computer programming, the present invention is described below with reference to symbolic representations of operations that are performed by computer system 10, unless indicated otherwise. Such operations are sometimes referred to as being computer-executed. It will be appreciated that the operations which are symbolically represented include the manipulation by CPU 14 of electrical signals representing data bits and the maintenance of data bits at memory locations in memory system 16, as well as other processing of signals. The memory locations where data bits are maintained are physical locations that have particular electrical, magnetic, optical, or organic properties corresponding to the data bits.

In accordance with an exemplary application of the present invention, when a proprietor of digital information wishes to distribute a new product, the product is encrypted using an appropriate encryption scheme (e.g. RSA, DES, Japanese FEAL etc.). The encrypted digital information is stored in a file, but individual segments of data which make up the file are encrypted according to some chosen encryption pattern. The data segments encrypted represent logical segments corresponding to an actual portion of the physical media on which the file is stored (e.g. sectors on a CD-ROM, hard disk, a memory block, etc). The encrypted information includes data indicating the original proprietor of the original digital information (i.e. the original file in which the digital information is stored).

The pattern used to encrypt the data segments can vary, but some portion of the data segments will typically be encrypted, and some portion of the data segments will remain un-encrypted. For example, every other data segment may be encrypted, every third segment, etc. A data segment may also be only partially encrypted, or may be encrypted using more than one encryption scheme. Using more than one encryption scheme changes the "depth" of the encryption segment providing additional protection to a portion of valuable data. The exact encryption scheme (e.g. RSA, DES, etc.) used can vary, but must be an encryption scheme known by the end user's computer system, otherwise decryption would not be possible. The encrypted data segments are combined with non-encrypted segments to form a file of digital information.

As the data segments are encrypted, the encryption information and encryption patterns are stored in a bitmap table which is distributed along with the encrypted digital information. The nature and structure of this bitmap table is detailed below.

Figure 2:
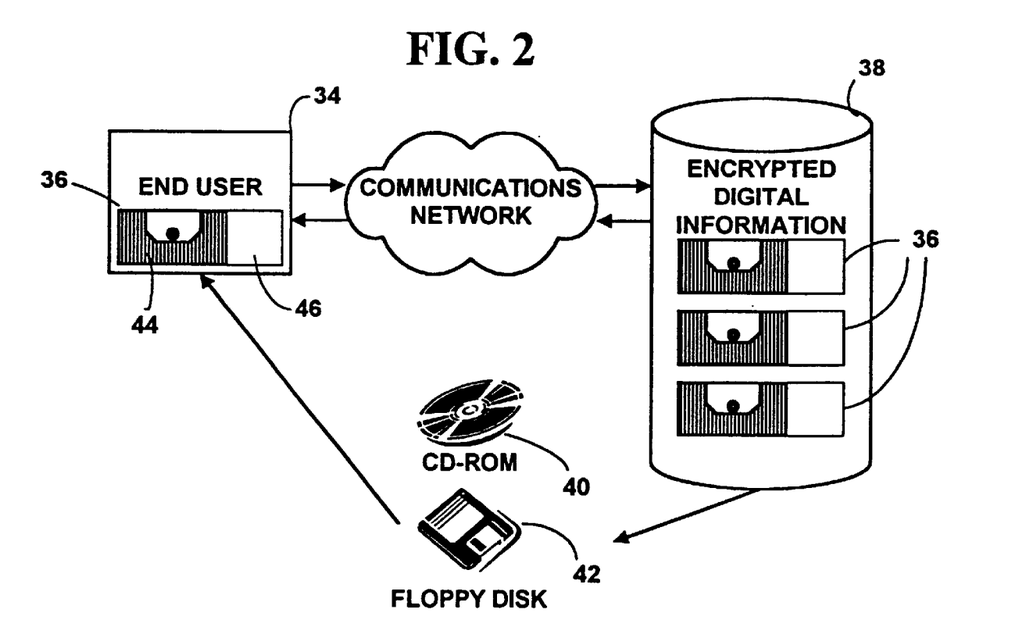
FIG. 2 illustrates how encrypted digital information is obtained by an end user.

Referring to FIG. 2, an end user 34 can obtain encrypted digital information 36, from a data depository 38 (e.g. via modem, wireless connection, Internet connection, computer network connection, network, etc.) and store the encrypted digital information directly in memory 16 (FIG. 1) or secondary storage 32 (FIG. 1) of the computer system 10 shown in FIG. 1. An end user may also obtain encrypted digital information on a CD-ROM 40 or a floppy disk 42 or other portable storage medium purchased or obtained from an information or software vendor.

Information 36 is typically divided into two parts: (1) an encrypted part 44 which contains a complete copy of the information; and (2) a non-encrypted part 46 which is used to preview the encrypted digital information and identifies the proprietor of the information. For example, if the digital information is a computer software game, the non-encrypted part 46 may show the user the first few screens or levels of the game. If the digital information is a software application, the non-encrypted part 46 may show the user the features of the software application. The encrypted part 44 is the actual digital information (e.g. game, application, multimedia information) which cannot be used without a decryption key. The decryption key can be obtained only after paying a required fee, as detailed below.

Figure 3:
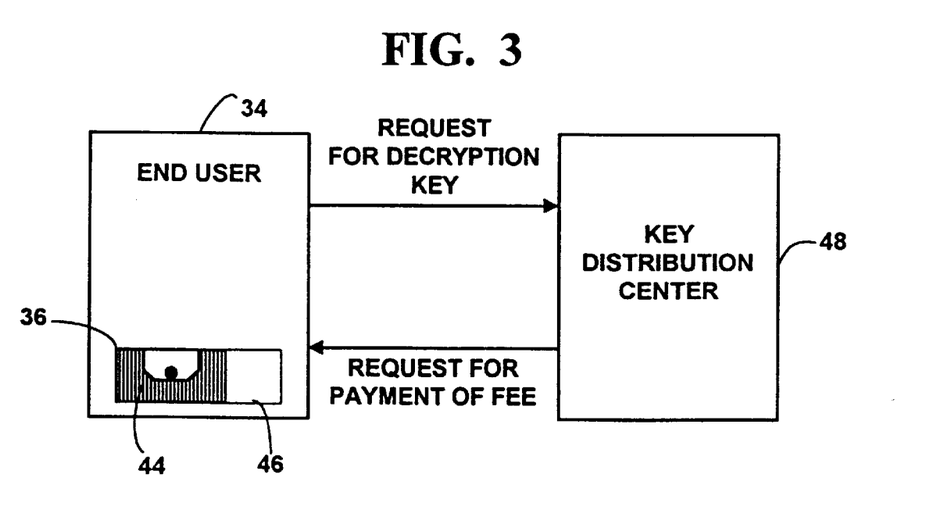
FIG. 3 shows how an end user requests a decryption key from a key distribution center.

After previewing the digital information, if an end user wishes 34 to use or "purchase" the digital information, the end user must request a decryption key to decrypt the encrypted part 44 of the digital information. This is shown in FIG. 3. An end user will make a request for a decryption key from a key distribution center 48 using a modem, an internet connection, a satellite connection, etc. Upon receiving the decryption key request, the key distribution center 48 requests a fee from the end user 34. The fee paid by the end user typically depends on what type of use the end user desires. The end user 34 might pay a fee for a limited number of plays for a game, or for a limited number of runs for a software application. Alternatively, the end user 34 might pay a fee based on use for a certain time period (e.g. several hours, a day, a month, etc.). Still further, the end user might purchase a license for the permanent right to use the digital information.

Figures 4, 5:
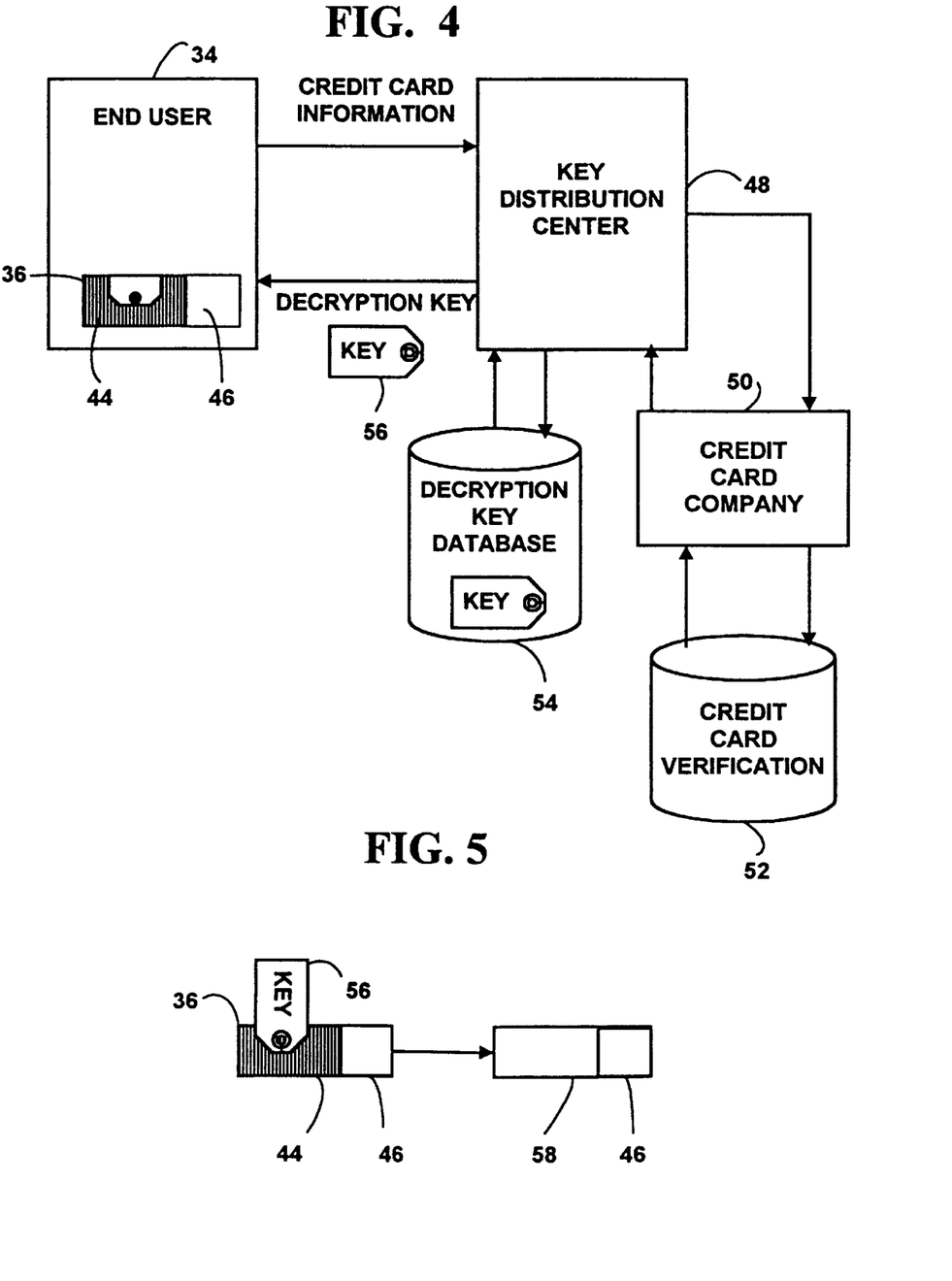
FIG. 4 shows how payment for a decryption key is provided.
FIG. 5 shows how a decryption key is applied to encrypted digital information.

As shown in FIG. 4, once the end user 34 has made a request for a decryption key, and the key distribution center 48 has made a request for a fee (as was shown in FIG. 3), the end user 34 will send credit card information to the key distribution center 48. The key distribution center will pass this information along to the proper credit card company 50 which will verify the end user's credit card information 52. If the end user's credit card information is valid and the user has credit available, the key distribution center 48 extracts a decryption key 56 from a database 54 for the desired use of the desired digital information, and transmits the key to the user.

When the end user receives the decryption key 56, the end user can decrypt the encrypted digital information 44 and use the actual digital information 58. FIG. 5 shows this fact conceptually. The use of key 56 to decrypt the encrypted digital information is explained in detail below.

The preferred embodiment of the invention is implemented in the form of embedded software components in the Windows 3.1 operating system and file system, and operates in conjunction with encrypted digital information stored in files on CD-ROMs. However, those skilled in the art will recognize that the invention can likewise be practiced with a variety of other data sources, and with a variety of other operating systems such as Windows 95, Windows NT, etc.

Figure 6:
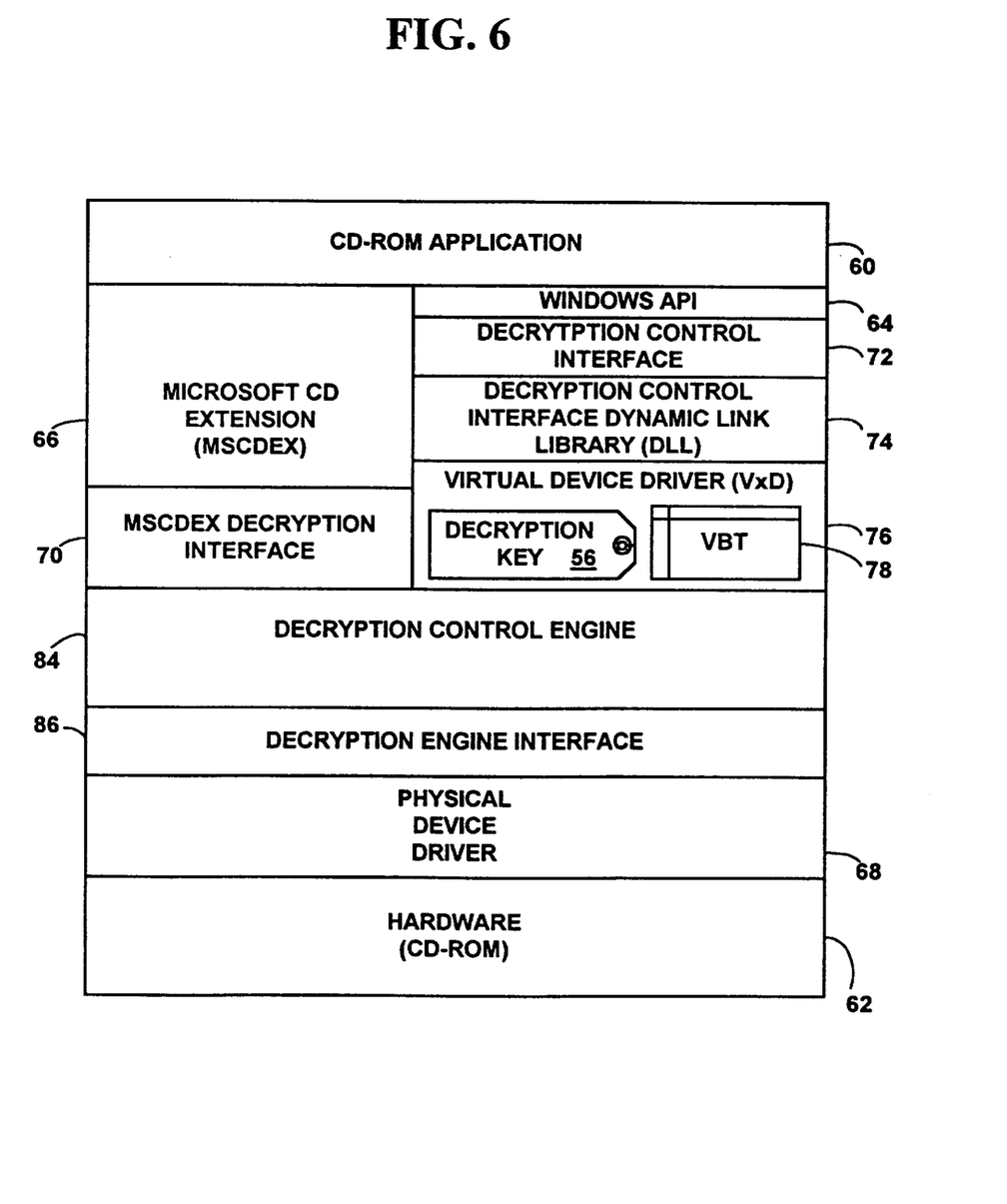
FIG. 6 is a block diagram showing a layered software architecture which decrypts encrypted digital information.

When an end user has obtained a decryption key 56, and wishes to access encrypted digital information 44 on a CD ROM 62, the user invokes an application program 60. As is shown in FIG. 6, to read data from the CD ROM, the application program 60 begins by issuing an \_lread command to the Windows application program interface 64 (API), or raises a MS-DOS interrupt INT21h AH=3fH directly (e.g. from a C or C++ language library call). (Windows \_lread uses INT21h AH=3Fh to access files through MS-DOS.)

Under MS-DOS, the CD ROM 62 is connected with the network interface (INT21h) and when a READ request is made, the request reaches a Microsoft CD Extension (MSCDEX) 66 (i.e. the Windows API will direct the READ request to MSCDEX 66). (If the encrypted digital information is stored on some other storage media such as a hard disk or floppy disk, etc. the appropriate software component equivalent to the MSCDEX 66 is called instead. Additional interfaces and software components are added to the operating system and file system to provide decryption functionality for other storage media.)

The Microsoft CD Extension 66 makes a READ request to the CD ROM 62 via the physical device driver 68. However, below the Microsoft CD Extension 66 is an MSCDEX decryption interface 70. This decryption interface 70 intercepts calls from the Microsoft CD Extension 66 for READs to the CD ROM 62 and allows embedded decryption control interface 72 to be called instead of making a direct call to the physical device driver 68, as would be the normal execution path without any decryption. The Microsoft CD Extension 66 "sees" the MSCDEX decryption interface 70 as the physical device driver 68 for the CD ROM 62.

The decryption control interface 72 provides a decryption interface for the CD ROM application 60. The encrypted information on the CD ROM 62 is stored in a file, but is decrypted on a sector-by-sector basis as it is read off the CD ROM 62. The decryption control interface 72 has an associated dynamic link library (DLL) 74 which contains routines that provide decryption functionality. The DLL 74 has some security features built in to make reverse engineering difficult. For example, DLL calls can normally be intercepted by other DLLs because their entry points are exported in a DLL header. In contrast, the object files in the decryption DLL 74 are linked directly to the embedded decryption control interface 72 and are not exported in the decryption DLL header files. This prevents interception by other DLLs since the calls to functions within the decryption DLL 74 are private and not publicly accessible to any other DLL. The DLL is also stored in protected memory (i.e. memory which can not be accessed by a debugger).

The decryption control interface 72 and associated DLL 74 act as a translation layer from the file-based encryption storage to the sector-based decryption scheme. When the decryption control interface 72 receives a READ request from the MSCDEX 66 that was intercepted by the MSCDEX decryption interface 70, it first sets the decryption key 56 obtained from the key distribution center 48 (FIG. 4) within protected memory in the decryption virtual device driver (VxD) 76. This protected memory cannot be accessed by conventional software tools such as debuggers, so an end user 34 cannot easily copy the decryption key 56 and pass it along to another end user. For further security, the decryption key can be stored in an encrypted format.

When the decryption key 56 is set in the decryption virtual device driver 76, a number of additional actions take place. First the decryption key type is examined. The decryption key 56 can be one of several types depending on the fee paid by the end user.

If the end user 34 has chosen to pay a fee for a limited duration (e.g. a few hours, days, etc.), an internal timer is set corresponding to the time duration paid for. The end user 34 can then decrypt (i.e. use) the encrypted software until the internal timer expires. After the timer expires, the decryption key 56 is marked as invalid by the Windows operating system, and as a result, the end user 34 can no longer use the encrypted software without paying an additional fee and obtaining a new decryption key 56.

If the end user 34 has paid a fee for a decryption key which limits the number of invocations (e.g. runs of a software application) of encrypted information, an internal counter is set corresponding to the number of invocations paid for. Each time the encrypted information is invoked, the counter is decremented. When the counter reaches zero, the decryption key 56 is marked as invalid. The end user is then required to pay an additional fee and obtain a new decryption key 56 to continue using the encrypted information.

If the end user 34 has a paid for an unrestricted license, no timer or counter is set.

Looking again at FIG. 6, after setting and processing the decryption key 56, the decryption control interface 70 extracts a volume bitmap table (VBT) 78 from the storage medium. A volume bitmap table is a bit map showing how the data segments of the storage medium are encrypted. The volume bitmap table is created when the digital information is encrypted. The encrypted digital information may have a single volume bitmap table that covers all files on the medium, or each file may have its own volume bitmap table.

Figure 7:
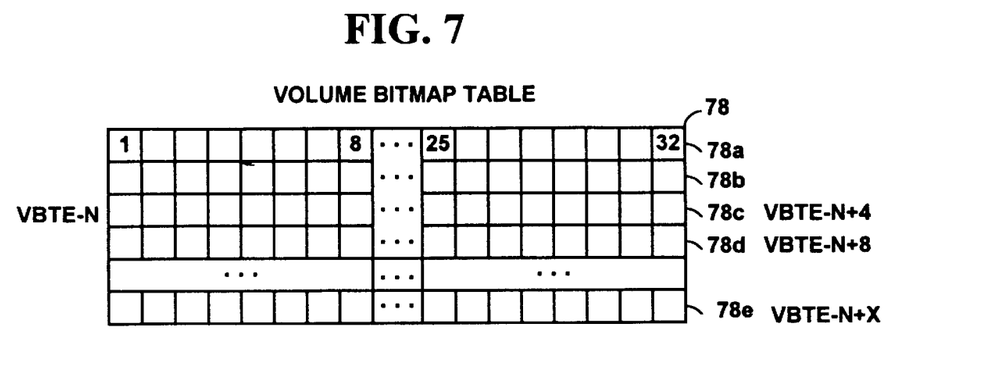
FIG. 7 shows a volume bitmap table used to record encrypted data sectors.

In the preferred embodiment, encrypted digital information and the associated volume bitmap table are stored on the same CD RON. Data areas on the CD ROM 62 are defined by ISO Standard ISO9660. Within ISO9660, the data area on each CD ROM is divided into logical sectors. Each sector comprises 2048 bytes (8-bits/byte). Each sector can be identified by a unique logical sector number (LSN) which starts with LSNO. A volume bitmap table 78 for a CD ROM 62 is shown in FIG. 7. Volume bitmap tables for other storage media have similar structures.

The CD ROM volume bitmap table 78 has a four byte (32-bit) length field 78a, which describes the limit of the bitmap, and a four byte (32-bit) identifying signature 78b which describes which piece or pieces of encrypted information are included in the table. The remainder of the volume bitmap table 78 is a collection of volume bitmap table entries 78c–78e which are each one byte (8-bits) long. Volume bitmap table entry 78c is labeled VBTE-N on the right and VBTE-N+4 on the left, since each row in the volume bitmap table is 32-bits long and each individual volume bitmap table entry is 8-bits long (32/8=4).

Figure 8:
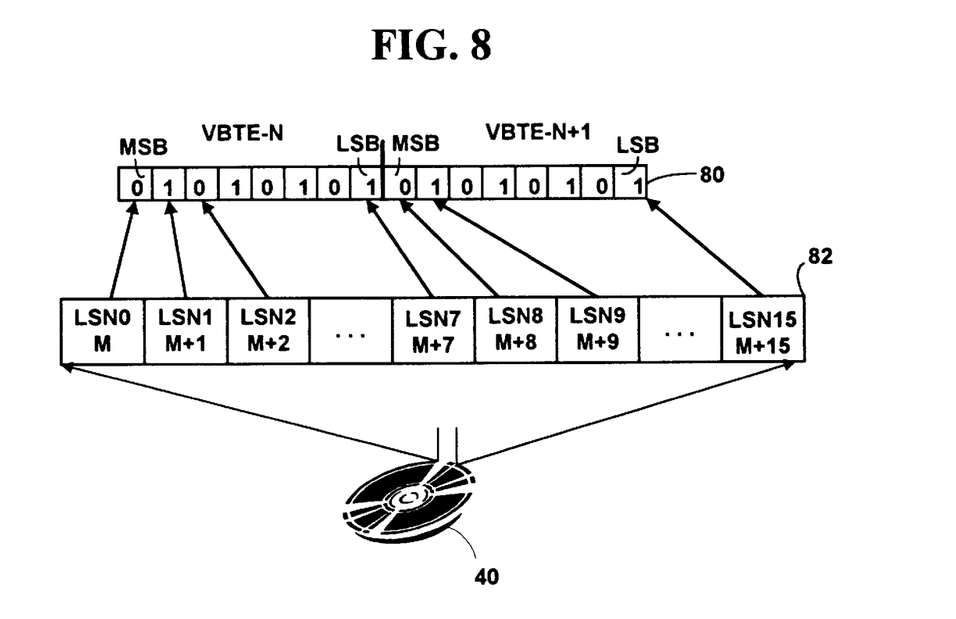
FIG. 8 illustrates mapping between the volume bitmap entry shown in FIG. 7 and a logical sector stored on a CD-ROM.

As shown in FIG. 8, since each individual volume bitmap table entry (VBTE) 80 is eight bits long, it therefore represents eight logical sector numbers (LSNS) 82 from the CD ROM 62. When a sector is encrypted, a bit is set (equal to 1) in the appropriate volume bitmap table entry 80 as the volume bitmap table 78 is built. For example, FIG. 8 shows an encryption pattern where every other sector is encrypted (i.e. a zero means the sector is not encrypted, a one means the sector is encrypted). Look up of encrypted sectors using the mapping shown in FIG. 8 is fast and easy. Any encrypted sector will have a bit set in the appropriate volume bitmap table entry.

When the logical sectors are read from the CD ROM the volume bitmap table entry N can quickly be found from the logical sector number M by calculating N=integer(M/8). From the volume bitmap table entry N, the bit corresponding to the logical sector number can quickly be examined using an offset corresponding to the LSN number to see if the sector is encrypted. This ensures that lookup of logical sectors that need to be decrypted will be fast when the encrypted file information is read on a sector-by-sector basis.

If a logical section is partially encrypted, or the encryption depth of sector is varied (i.e. more than one encryption scheme used), the volume bitmap table varies in structure. For example, additional information can be added to each entry in the volume bitmap table to define and describe the partial encryption and/or a change in encryption depth for each logical sector, etc.

Referring again to FIG. 6, after extracting the necessary volume bitmap table(s) 78 from the storage medium, the decryption control interface 72 passes the volume bitmap table(s) 78 to the decryption virtual device driver 76. Control is passed to the decryption control engine 84, which is statically linked to the virtual device driver 76 (so it has access to the volume bitmap table 78 and the decryption key 56).

The decryption control engine's 84 functionality is dependent on the encryption scheme used to encrypt the digital information. In the preferred embodiment, the Japanese encryption/decryption scheme "FEAL" developed by Nippon Telephone and Telegraph is used, but any other appropriate encryption/decryption scheme known in the prior art such as RSA, DES, etc. could also be used.

The decryption control engine 84 is a "snap-out" module. That is, this software component 84 can be quickly and easily replaced if the encryption scheme should be changed. The decryption control engine 84 is also capable of supporting several different encryption schemes at the same time. None of the other software components shown in FIG. 6 has to be changed if the decryption engine 84 is replaced. This makes the whole decryption scheme very flexible and easy to adopt to new products. It also does not matter what encryption pattern may be used. The encryption pattern is built into the volume bitmap table at the time the digital information is encrypted. As a result, if every other sector in one application was encrypted, and every third sector in another application was encrypted, the decryption control engine 84 simply determines these facts from the volume bitmap table 78 provided to it by the decryption control interface 72.

Returning again to FIG. 6, the decryption control engine 84 next passes the READ request to the physical device driver 68 which actually reads sectors off of the CD ROM 62. The physical device driver 72 thinks it has been called by the MSCDEX 66 and tries to return logical sector information back to the MSCDEX 66. However, the decryption engine interface 86 intercepts the return call from the physical device driver 68 and directs sectors information back to the decryption engine 84. The decryption control engine 84 then uses the volume bitmap table 78 as it receives sector information. After checking the volume bitmap table 78, if the sector is encrypted, it will be decrypted using the proper decryption scheme. If the sector is not encrypted, it will not be processed. Non-encrypted sectors are simply passed directly back up to the decryption control interface 72.

All sector information passed up to the decryption control interface 70 is then passed back to MSCDEX 66. MSCDEX 66 then passes the sector information read back to the CD ROM application 60 via the Windows API 64. The CD ROM 60 application receives only decrypted sector information from the CD ROM 62. The intermediate steps are invisible to the CD ROM application 60. As far as the CD ROM application knows, it has read sector information directly off of the CD ROM 62 (or other storage medium) without any intermediate processing.

Since lookup of the encrypted sectors is fast, and the sectors are decrypted in 2048 byte chunks, the decryption engine will decrypt at a rate well in excess of the 150 kilo-bytes-per-second transfer rate of standard CD ROM drives. This rate will be much faster if a sparse pattern of sector skipping is used for encryption.

The encrypted file or files are decrypted on the fly by the operating system, and almost any kind of encrypted data files can be dealt with quickly and seamlessly. The end user 34 has no notion the file or files containing the encrypted digital information is being decrypted on the fly. The end user simply invokes the CD ROM application 60 to READ the CD ROM and use the digital information stored on it.

Figure 9A:
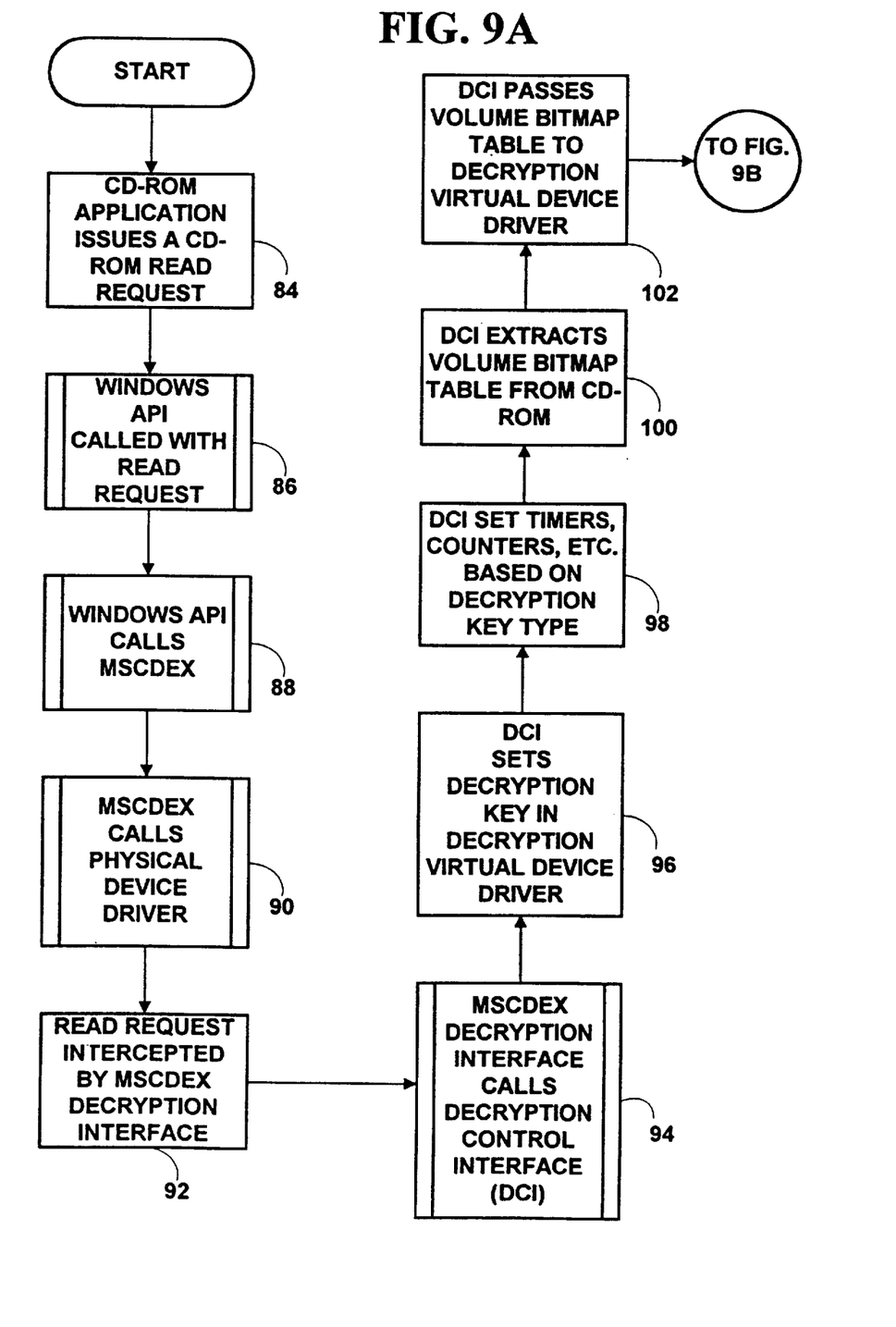
FIGS. 9A and 9B are flow charts showing the internal operations that take place when a CD-ROM application executes a read command for encrypted CD-ROM data.
Figure 9B:
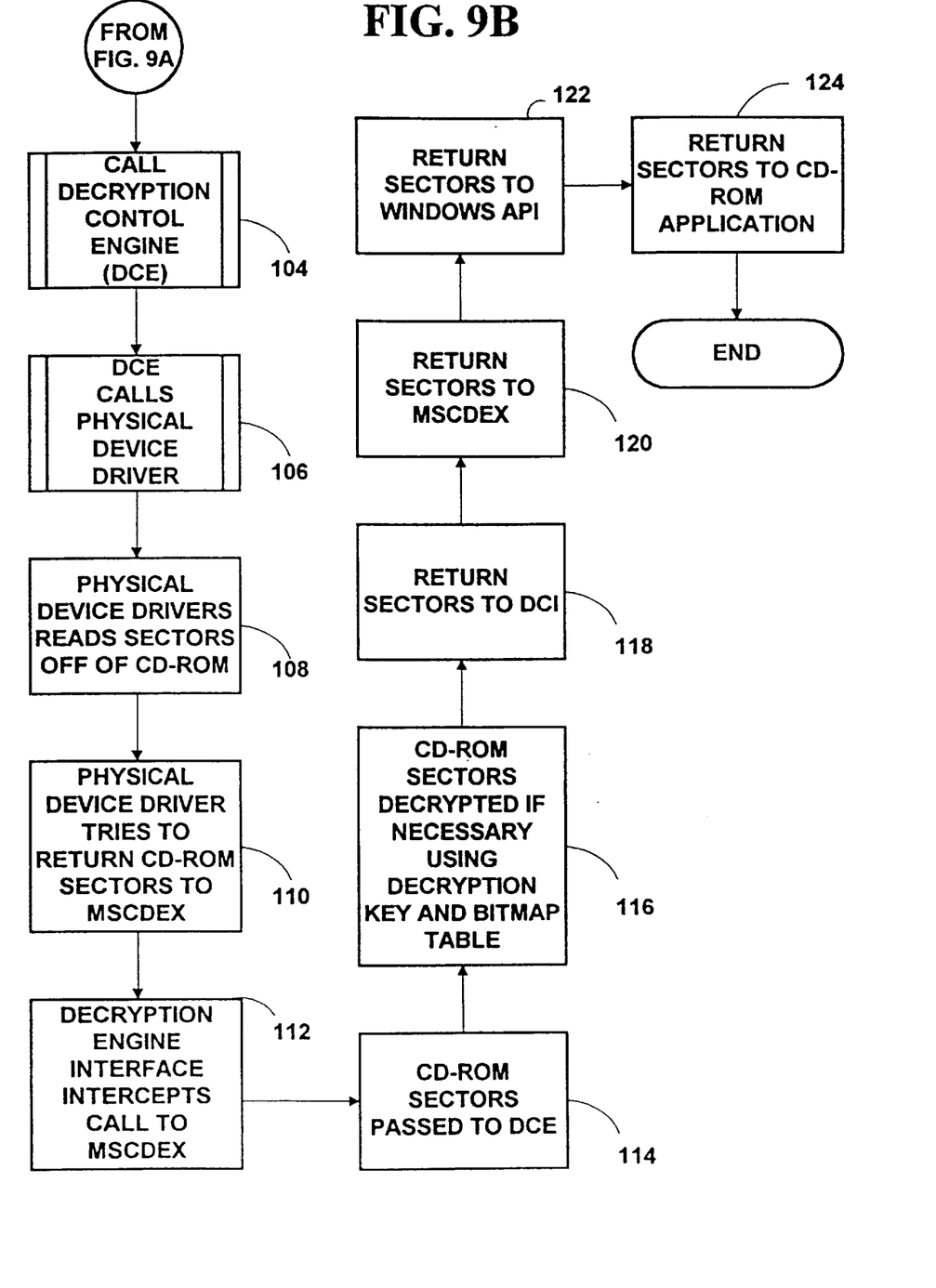

The actual pathway for a READ request for digital information from the CD ROM application to the CD ROM 62 is shown in FIGS. 9A and 9B. The software components referred to in FIGS. 9A and 9B are shown in FIG. 6. Referring to FIG. 9A, when a Windows CD ROM application issues (84) a READ request for CD ROM information, the READ request is passed (86) to the Windows API. The Windows API then calls (88) the Microsoft® CD-Extension (MSCDEX). MSCDEX calls (90) the physical device driver to read CD ROM information. However, the READ request to the physical device driver is intercepted (92) by the MSCDEX decryption interface. The MSCDEX decryption interface then calls (94) the decryption control interface (DCI). The decryption control interface sets (96) the decryption key in protected memory within the decryption virtual device driver. After examining the decryption key, the decryption control interface sets (98) any timers or counters based on the key type. The decryption control interface then extracts (100) the volume bitmap table from the CD ROM corresponding to the desired digital information. The volume bitmap table is then passed (102) to the decryption virtual device driver.

Now referring to FIG. 9B, the decryption control interface next calls (104) the decryption control engine (DCE). The decryption control engine passes (106) the READ request to the physical device driver for the CD ROM. The physical device driver will read (108) sector information off the CD ROM. However, the physical device driver will try to return (110) the CD ROM sector information to the Microsoft CD-extension. The decryption engine interface intercepts (112) the return call to the MSCDEX. The sector information is instead passed (114) back to the decryption control engine. The decryption control engine, using the decryption key and the volume bitmap table, decrypts (116) the sector information if necessary. The sectors (now all decrypted) are then returned (118) to the decryption control interface, which passes (120) them back to the MSCDEX. The MSCDEX returns (122) the sectors to the Windows API, which finally returns (124) the sectors of data to the calling CD ROM application 60.

The software components used for decryption shown in FIG. 6 are desirably implemented using object oriented programming techniques which are well known in the prior art. In accordance with such techniques, shareable resources, such as files, application program interfaces (APIs), etc. are implemented as "objects" and are accessed by using "object services." As is well known in the art, an "object" is a data structure whose physical format is hidden behind a type definition. Object data structures, also referred to as records or formats, are organization schemes applied to data so that the data can be interpreted and so that only specific operations can be performed on the object data. Defining the decryption software components as objects provides portable adaptable components with clean interfaces, as well as providing an additional layer of data security, since only specific operations can be performed on, and specific function calls made to, the decryption objects.

Having illustrated and described the principles of the present invention in a preferred embodiment, it should be apparent to those skilled in the art that the embodiment can be modified in arrangement and detail without departing from such principles. Accordingly, we claim as our invention all such embodiments as come within the scope and spirit of the following claims and equivalents thereto.

We claim:

1. A method of file system operation in a computer comprising:
   receiving a request through a computer operating system to read a unitary file of data, said unitary file comprising a plurality of non-encrypted segments interspersed with at least two encrypted segments, all stored on a single storage medium;
   determining which of said file segments is encrypted;
   reading the encrypted segment and decrypting same;
   reading the non-encrypted segments;
   assembling the non-encrypted segments with the decrypted segment to produce an original unitary file of data; and
   providing the assembled unitary file of data in response to said request;
   wherein at least one encrypted segment is encrypted using a first encryption procedure and a second encrypted segment is encrypted using a second encryption procedure, different than the first encryption procedure.

2. The method of claim 1 in which the determining step comprises consulting a set of map data to determine which segments are encrypted.

3. The method of claim 2 which includes reading the set of map data from a storage medium, said storage medium also including the encrypted and non-encrypted segments of the unitary file.

4. The method of claim 2 in which the set of map data comprises a bit table in which a single bit in said table indicates whether a corresponding segment of the unitary file is encrypted.

5. The method of claim 1 in which the segments of the unitary file are read from a storage medium located at the computer.

6. The method of claim 1 in which the segments of the unitary file are read from a remote storage medium linked to the computer through a telecommunications circuit.

7. A method of encrypting and storing an original, unitary file of data comprising:
   dividing the unitary file into a plurality of segments;
   allocating to each of said segments a corresponding portion of a single physical storage medium;
   storing a first of said segments in a corresponding portion of the single physical storage medium without encryption;
   encrypting a second of said segments; and
   storing the encrypted segment in a corresponding portion of the single physical storage medium;
   wherein at least one of the encrypted segments is encrypted with a different encryption procedure than another of the encrypted segments.

8. The method of claim 7 which further includes:
   identifying a key useful in decrypting said second segment;
   providing said identified key to a file system associated with an authorized computer with which said physical storage medium is associated; and
   in response to a file system service request issued by a central processing unit (CPU) of the authorized computer, restoring the original unitary file of data, said restoration including automatically applying said key to said second segment, said restoration being transparent to a user of the authorized computer;
   wherein the original file is protected from unauthorized use, yet is transparently available to the CPU of the authorized computer through its file system, said transparent availability being provided without the delay associated with decrypting the entirety of the file.

9. The method of claim 8 in which the unitary file is divided into a plurality of first segments and a plurality of second segments, and the first and encrypted second segments are interspersed together for storage on the physical storage medium.

10. The method of claim 9 which further includes providing the file system with map data identifying which of said interspersed segments are first segments.

11. The method of claim 10 which includes storing the map data in the physical storage medium, and providing the map data therefrom to the file system.

12. The method of claim 11 which includes storing exactly one set of map data in the physical storage medium, said stored set of map data having data therein relating to a plurality of processed files stored in the physical storage medium.

13. The method of claim 11 which includes storing a plurality of sets of map data in the physical storage medium, each of said stored sets of map data corresponding to one of the processed files stored in said physical storage medium.

14. The method of claim 8 in which the physical storage medium is a CD ROM.

15. The method of claim 8 in which the physical storage medium is a remote data repository linked to the authorized computer through a telecommunications circuit.

16. The method of claim 8 in which the physical storage medium is a remote data repository linked to the authorized computer through a network connection.

17. The method of claim 8 which includes limiting a period of time the authorized computer can use the restored original unitary file of data.

18. The method of claim 8 which includes limiting a number of times the authorized computer can use the restored original unitary file of data.

19. The method of claim 8 which includes associating the first and second segments with an object, the object further having data associated therewith that defines a plurality of attributes.

20. The method of claim 19 in which the object includes data indicating a proprietor of the original data file.

21. A physical storage medium having data processed according to the method of claim 8 stored thereon, said storage medium further having map data indicating which of said segments are encrypted and which are non-encrypted also stored thereon.

22. The physical storage medium of claim 21 comprising a CD ROM having a plurality of surface features thereon, said features encoding the first and second segments and said map data.

23. The physical storage medium of claim 22 in which the map data is stored in a table that also includes data indicating a type of encryption used for a second segment.

24. The method of claim 7 which includes:
   encrypting the second of said segments according to a first encryption procedure;
   encrypting a third of said segments according to a second encryption procedure different than the first, and storing the third segment in a corresponding portion of the physical storage medium.

25. The method of claim 7 which includes storing map data in said physical storage medium, said map data permitting determination of the encryption procedure used, if any, for each of the portions of the storage medium comprising the unitary file.

26. The method of claim 7 which includes storing map data in said physical storage medium, said map data permitting determination of whether a portion of the physical storage medium includes an encrypted segment of said unitary file.

27. The method of claim 7 which includes storing a plurality of non-encrypted segments of said unitary file interspersed with a plurality of encrypted segments.

28. A storage medium having data produced by the process of claim 7 stored therein.

29. A computer-readable storage medium having stored therein instructions capable of causing a computer to perform the method of claim 26.

30. A computer-readable storage medium having stored therein instructions capable of causing a computer to perform the following method:
   receiving a request through a computer operating system to read a unitary file of data, said file comprising a plurality of non-encrypted segments interspersed with at least two encrypted segments on a single storage medium;
   determining which of said file segments is encrypted;
   reading the encrypted segment and decrypting same;
   reading the non-encrypted segments;
   assembling the non-encrypted segments with the decrypted segment to produce an original unitary file of data; and
   providing the assembled file of data in response to said request;
   wherein some of the encrypted segments are encrypted with different encryption procedures than others of the encrypted segments.

31. A computer-readable storage medium having stored therein instructions capable of causing a computer to perform the following method:
   dividing a unitary file into a plurality of segments;
   allocating to each of said segments a corresponding portion of a single physical storage medium;
   storing a first of said segments in a corresponding portion of the single physical storage medium without encryption;
   encrypting a second of said segments using a first encryption technique;
   encrypting a third of said segments using a second encryption technique; and
   storing the encrypted segment in a corresponding portion of the single physical storage medium.

32. A computer system including a microprocessor and a software program, the software program utilizing an application program interface to request services from a windowed operating system, the requested services relating to transparent sector-based encryption and decryption of information stored on a single storage medium in a file system of a computer operating system, wherein file data is protected from unauthorized use, yet is transparently available to a user without delay associated with decrypting, the application program interface including a separate command to request each of the following services:
   identifying one or more keys useful for decrypting a unitary file written as a plurality of non-encrypted segments interspersed with at least two encrypted segments that are encrypted using different encryption techniques; and
   reading a unitary file of data, said file comprising a plurality of non-encrypted segments interspersed with at least two encrypted segments using one or more decryption procedures.

33. The method of claim 32 in which the operating system performs the following operations in response to a request to read a unitary file of data, said file comprising a plurality of non-encrypted segments interspersed with at least one encrypted segment:
   determining which of said file segments is encrypted;
   reading the encrypted segments;
   determining the encryption procedure used to encrypted the encrypted file segments;
   retrieving a key useful in decrypting each of the encryption procedures;
   decrypting the encrypted segments using the determined encryption procedure and the retrieved key;
   reading the non-encrypted segments;
   assembling the non-encrypted segments with the decrypted segments to produce an original file of data; and
   providing an assembled file of non-encrypted original data in response to said read request.

34. A computer system including a microprocessor and a software program, the software program utilizing an application program interface to request services from a windowed operating system, the requested services relating to transparent sector-based encryption and decryption of information stored on a single storage medium in a file system of a computer operating system, wherein file data is protected from unauthorized use, yet is transparently available to a user without delay associated with decrypting, the application program interface including a separate command to request each of the following services:
   identifying one or more encryption procedures used to encrypt a unitary file of original information; and
   writing a unitary file of data, said file written as a plurality of non-encrypted segments interspersed with at least two encrypted segments using at least two encryption procedures.

35. The method of claim 34 in which the operating system performs the following operations in response to a service request to write a unitary file of data dividing the data into a plurality of file segments;

allocating to each of said segments a corresponding portion of a physical storage medium;

storing a first of said segments in a corresponding portion of the physical storage medium without encryption;

identifying one or more encryption procedures to be used to encrypt said segments;

encrypting a second of said segments according to a first encryption procedure;

storing the second encrypted segment in a corresponding portion of the physical storage medium;

encrypting a third of said segments according to a second encryption procedure, if any, different from the first encryption procedure;

storing the third encrypted segment, if any, in a corresponding portion of the physical storage medium;

storing encryption map data in said physical storage medium permitting determination of the encryption procedure used;

storing encryption map data in said physical storage medium permitting determination of which segments are encrypted; and storing a plurality of non-encrypted segments interspersed with a plurality of encrypted segments in a corresponding portion of the physical storage medium as a unitary file.

36. A method of file system operation in a computer comprising:

receiving a request through a computer operating system to read a unitary file of data, said unitary file comprising a plurality of non-encrypted segments interspersed with at least one encrypted segments;

determining which of said file segments is encrypted;

reading the encrypted segment and decrypting same;

reading the non-encrypted segments;

assembling the non-encrypted segments with the decrypted segment to produce an original unitary file of data; and providing the assembled unitary file of data in response to said request;

wherein the unitary file of data cannot be used without a decryption key.

37. The method of claim 36 wherein at least one of the encrypted segments uses a different encryption procedure than at least one other encrypted segment.

38. A computer system including a microprocessor and a software program, the software program utilizing an application program interface to request services from a windowed operating system, the requested services relating to transparent sector-based encryption and decryption of information stored on a single storage medium in a file system of a computer operating system, wherein file data is protected from unauthorized use, yet is transparently available to a user without delay associated with decrypting, the application program interface including a separate command to request each of the following services:

identifying one or more keys useful for decrypting a unitary file written as a plurality of non-encrypted segments interspersed with at least one encrypted segments; and reading a unitary file of data, said file comprising a plurality of non-encrypted segments interspersed with the at least one encrypted segments using one or more decryption procedures;

wherein the unitary file is not usable when it contains the at least one encrypted segments, without a decryption key.

* * * * *